(12) United States Patent
Taylor

(10) Patent No.: US 11,794,784 B1
(45) Date of Patent: Oct. 24, 2023

(54) CONFORMAL PATH GRID

(71) Applicant: Zoox, Inc., Foster City, CA (US)

(72) Inventor: Giacomo Zavolta Taylor, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 142 days.

(21) Appl. No.: 17/490,315

(22) Filed: Sep. 30, 2021

(51) Int. Cl.
*B60W 60/00* (2020.01)
*B60W 50/00* (2006.01)

(52) U.S. Cl.
CPC ........ *B60W 60/0027* (2020.02); *B60W 50/00* (2013.01); *B60W 2050/0028* (2013.01); *B60W 2530/201* (2020.02); *B60W 2552/30* (2020.02); *B60W 2554/801* (2020.02); *B60W 2554/802* (2020.02)

(58) Field of Classification Search
CPC ............. B60W 60/0027; B60W 50/00; B60W 2530/201; B60W 2552/30; B60W 2554/802; B60W 2554/801; B60W 2050/0028
See application file for complete search history.

(56) References Cited

U.S. PATENT DOCUMENTS

| | | | | |
|---|---|---|---|---|
| 9,823,661 | B2 * | 11/2017 | Pink | G01S 13/931 |
| 2020/0182626 | A1 * | 6/2020 | He | G06T 7/11 |
| 2020/0191907 | A1 * | 6/2020 | Jo | G01S 13/42 |
| 2021/0086780 | A1 * | 3/2021 | Zhang | G05D 1/0088 |
| 2021/0291816 | A1 * | 9/2021 | Lilja | B60W 30/08 |
| 2021/0331679 | A1 * | 10/2021 | Lilja | G06V 20/588 |
| 2021/0380106 | A1 * | 12/2021 | Chinni | B60W 10/20 |
| 2022/0105955 | A1 * | 4/2022 | Shridhar | G08G 1/166 |

FOREIGN PATENT DOCUMENTS

| | | | | |
|---|---|---|---|---|
| DE | 102013018315 | A1 * | 4/2015 | ........ B60W 30/0953 |
| WO | WO-2022199855 | A1 * | 9/2022 | |

OTHER PUBLICATIONS

Machine Translation of DE 102013018315 A1 (Year: 2015).*

* cited by examiner

*Primary Examiner* — Hussein Elchanti
*Assistant Examiner* — Kenneth M Dunne
(74) *Attorney, Agent, or Firm* — Lee & Hayes, P.C.

(57) ABSTRACT

Techniques for determining a warped occupancy grid fit to a vehicle trajectory are discussed herein. In some examples, a portion of memory may be allocated to an occupancy grid. Further, a warped occupancy grid can be warped and associated with an environment that an autonomous vehicle is traversing according to a trajectory and/or throughway. A transformation maybe be determined between the warped occupancy grid and the memory allocated to the occupancy grid. Sensor data can be received from a sensor associated with the autonomous vehicle and may be associated with the warped occupancy grid and stored in the occupancy grid. The autonomous vehicle may be controlled according to the warped occupancy grid by identifying sensor data returns in cells of the warped occupancy grid that may indicate a detection of an object in a path of travel of the vehicle.

20 Claims, 8 Drawing Sheets

FIG. 4  ✕ = LIDAR RETURN POINT

CONFORMAL PATH GRID

BACKGROUND

Vehicles can capture sensor data to detect objects in an environment. While the sensor data generally can be utilized to detect the objects, system limitations associated with storing the sensor data may result in a delay in detecting objects or objects being undetected in rare occasions. For instance, when processing sensor data of a curved roadway, a larger area of sensor data may than needed may be stored to encapsulate the curvature of the roadway, resulting in wasted storage space. Additionally, processing power may be wasted on a large chunk of sensor data associated with an area outside of the roadway, which can lead to delays in processing the actual roadway. Storage of unused sensor data and/or delays in the processing of the sensor data may lead to processing a smaller future portion of the roadway, less accurate detections of potential collisions, and untimely deployment of safety measures may not be possible.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
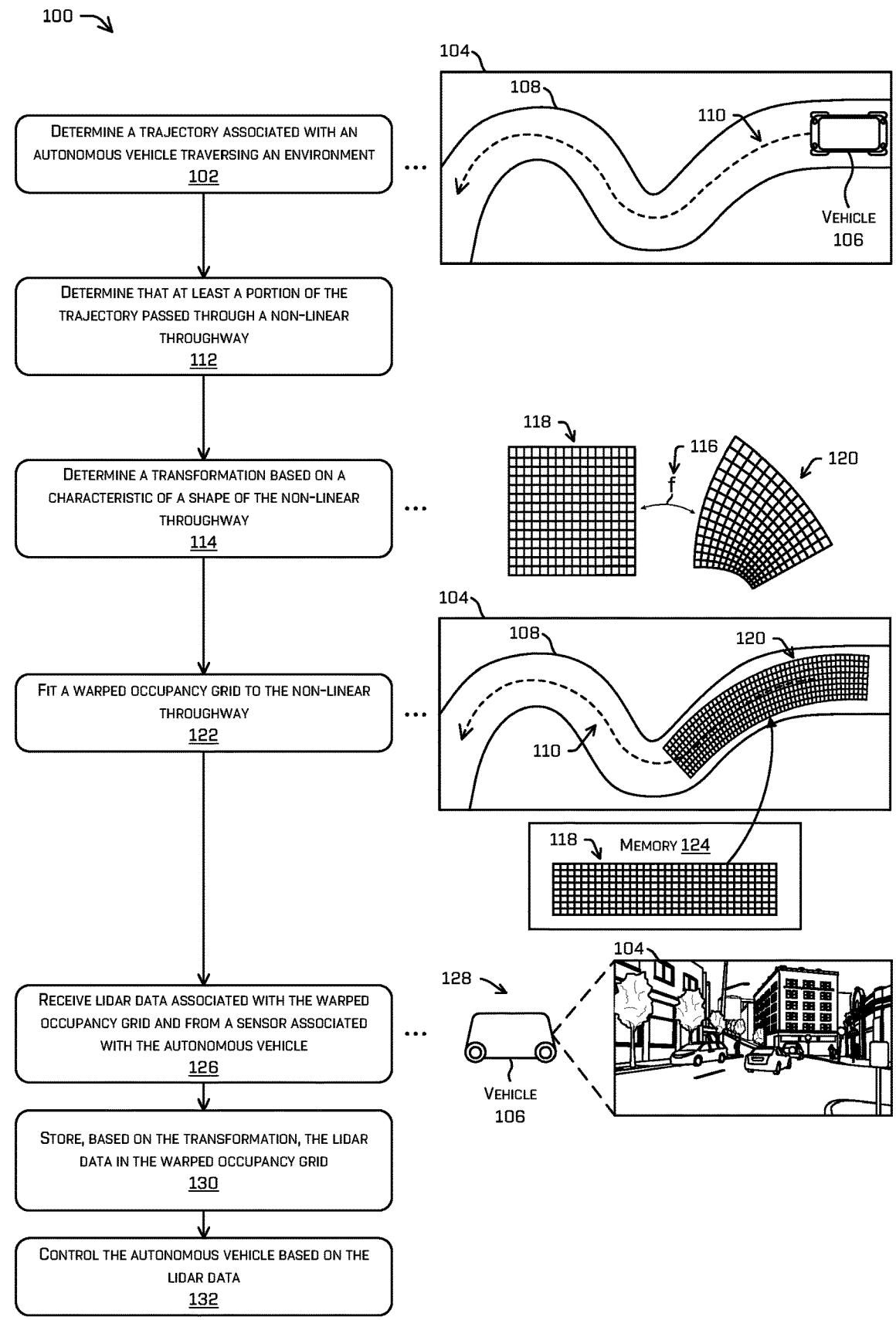
FIG. 1 is a pictorial flow diagram of an example process for determining a transformation based on a non-linear throughway that is passed through by a trajectory of a vehicle and fitting a warped occupancy grid, determined based on the transformation, to the non-linear throughway.

Techniques for determining a warped occupancy grid fit to a vehicle trajectory, roadway, or other features are discussed herein. For example, this application relates to techniques for allocating a portion of memory to an occupancy grid, determining a warped occupancy grid associated with an environment that an autonomous vehicle is traversing according to and/or fit to a trajectory of the autonomous vehicle, determining a transformation between the warped occupancy grid and the memory allocated to the occupancy grid, receiving sensor data (e.g., lidar data) from a sensor associated with the autonomous vehicle, associating the sensor data with the warped occupancy grid, storing the sensor data in the occupancy grid based on the transformation, and controlling the autonomous vehicle according to the sensor data. A cell of the warped occupancy grid may be associated with a sensor data point return that, in some examples, indicate a detection of an object in the path of the trajectory, and the autonomous vehicle may be controlled and/or the trajectory of the autonomous vehicle may be altered such that the autonomous vehicle avoids a collision with the object. In some examples, the sensor data may be stored in the memory allocated to the occupancy grid based on the transformation between the warped occupancy grid and the occupancy grid to reduce an amount of storage and/or improve the speed of processing sensor data points. For example, sensor data points associated with a cell of an occupancy grid, but that do not correspond to a cell of the warped occupancy grid, based on the transformation, may not be stored and/or processed to provide for compact storage of sensor data and heightened resources available to process data points associated with the warped occupancy grid fit to the trajectory of the vehicle.

In some examples, a warped occupancy grid may be comprised of portions, or chunks, of an occupancy grid associated with an environment. A warped occupancy grid may be configured to comprise any number of chunks of an occupancy grid. In some examples, the portions may be determined based on a curvature, a distance, and/or a time period associated with a portion a received vehicle trajectory. Additionally, or alternatively, the portions may be determined based on a density of received data points associated with an autonomous vehicle. For example, a first portion of a trajectory may correspond to a first portion of a roadway that is substantially straight, such that a curvature of the first portion is determined to be below a threshold curvature, and a second portion of the trajectory may correspond to a second portion of a roadway that includes a substantial curve (e.g., a windy roadway), such that a curvature of the second portion is determined to be above a threshold curvature. As such, a first portion of a warped occupancy grid associated with the environment and corresponding to the first portion of the trajectory may be determined and/or a second portion of a warped occupancy grid associated with the environment and corresponding to the second portion of the trajectory may be determined. In some examples, the first portion may be joined to the second portion to form a warped occupancy grid associated with the trajectory. In some examples, a transformation between a portion of an occupancy grid, allocated a portion of memory, and a warped occupancy grid portion may be determined using an algorithm, such as, for example, a conformal mobius transformation algorithm, allowing for accurate transformation of data points from a portion of an occupancy grid to a warped occupancy grid portion and/or from a warped occupancy grid portion to a portion of an occupancy grid.

As previously described, the warped occupancy grid may be fit to a received trajectory. For example, individual portions of a warped occupancy grid may correspond to respective portions of the trajectory to facilitate fitting the warped occupancy grid to the curvature of the trajectory. In some examples, the width of individual portions of the warped occupancy grid may be determined based on a width and/or aspect(s) associated with respective portions of a received trajectory. For example, a warped occupancy grid portion may be determined to be near, and/or adjacent to, the vehicle (e.g., at a longitudinal end of a vehicle, a side of the vehicle, and/or a combination thereof). In some examples, a first warped occupancy grid portion may be determined to be continuous from a second warped occupancy grid portion, and may continue along the trajectory (e.g., a warped occupancy grid portion may correspond to a portion of the trajectory predicted to be encountered by the vehicle at a later time than another warped occupancy grid portion). Additionally, or alternatively, a first warped occupancy grid portion may be determined to be in front of the vehicle and substantially perpendicular from a second warped occupancy grid portion and/or a portion of the trajectory that corresponds to the second warped occupancy grid portion (e.g., a warped occupancy grid portion may correspond to an intersection of a roadway substantially perpendicular to a roadway associated with the trajectory).

Additionally, or alternatively, the width of individual portions of the warped occupancy grid may be determined based on information associated with the vehicle and/or the environment. The information may be utilized to determine a bounding box associated with the vehicle. In some examples, a width associated with a warped occupancy grid (or a portion thereof) may be determined based on a bounding box (e.g., a bounding box associated with the vehicle). Further, a received trajectory may be discretized, as described above (e.g., the portions of the trajectory). In some examples, a width of each of the warped occupancy grid portion(s) may be determined based on a first width (e.g., a fixed width) and/or a second width based on a point associated with the bounding box and an edge of the portions of the trajectory and/or a fixed distance, such as, for example a fixed distance associated with a type of the vehicle. An extent of a portion of a trajectory may be determined based at least in part on speed limits, sensor ranges, previously observed objects in the area, and the like so as to limit the amount of processing performed in the safety system.

The vehicle may receive, and filter sensor data that is stored in memory allocated to an occupancy grid by associating the sensor data with a warped occupancy grid associated with an environment through which the vehicle is travelling. For example, since the warped occupancy grid may be fit to a trajectory of the vehicle, the sensor data may be filtered to determine sensor data associated with the warped occupancy grid that correspond to portions of an associated occupancy grid. The sensor data associated with the warped occupancy grid may be utilized to determine an object associated with the warped occupancy grid and determine any potential safety issues that may be associated with the vehicle trajectory (e.g., potential collisions or otherwise) and/or to invoke any safety actions (e.g., updating a maneuver, invoking an emergency stop, etc.).

The techniques discussed herein may improve functioning of a computing device in a number of additional ways. In some examples, determining the warped occupancy grid (or portions thereof) may be utilized to decrease an amount of data that is stored and/or processed to avoid potential collision(s) in an environment. For example, having a large occupancy grid (e.g., square and/or cubic occupancy grids) associated with an environment uses a significant amount of memory, much of which that is stored and processed will not be used to identify potential collision(s) along a trajectory of a vehicle. However, since the warped occupancy grid may be fit to a trajectory associated with the vehicle, only the data points from portions of the occupancy grid associated with the environment that map to corresponding points of the warped occupancy grid may be stored, allowing for data points to be stored in memory in a more compact manner and processed with greater efficiency and accuracy. By utilizing the warped occupancy grid to essentially filter the sensor data, resources may be conserved and/or reallocated for different tasks. The data points stored within the memory that maps to the warped occupancy grid(s), instead of the entire occupancy grid of an environment, may be analyzed to determine a potential collision and decrease an amount of data required to be analyzed. Resources utilized to control the vehicle may be conserved by determining the potential collision at an earlier time and by simplifying an amount and/or complexity of processing required to determine a modified acceleration profile.

The techniques described herein can be implemented in a number of ways. Example implementations are provided below with reference to the following figures. Although applicable to vehicles, such as autonomous vehicles, the methods, apparatuses, and systems described herein can be applied to a variety of systems and are not limited to autonomous vehicles. In another example, the techniques can be utilized in an aviation or nautical context, or in any system configured to input data to determine movement associated with objects in an environment. Additionally, the techniques described herein can be used with real data (e.g., captured using sensor(s)), simulated data (e.g., generated by a simulator), or any third of the two.

FIG. 1 is a pictorial flow diagram 100 of an example process for determining a transformation based on a non-linear throughway that is passed through by a trajectory of a vehicle and fitting a warped occupancy grid, determined based on the transformation, to the non-linear throughway.

At operation 102, the process may include receiving a trajectory (or area) associated with a vehicle (e.g., an autonomous vehicle) traversing an environment. Additionally, or alternatively, the process may include determining a trajectory (or area) associated with a vehicle traversing an environment. In some examples, the trajectory may be received from and/or determined by a planning component and/or one or more sensors of the autonomous vehicle (e.g., wheel encoders, GPS, etc.).

As illustrated, an example environment 104 may include a vehicle, such as, for example, an autonomous vehicle 106, traversing a throughway 108 (e.g., a roadway, a water passage, etc.) of the environment 104. In some examples, the autonomous vehicle 106 may be configured to traverse the throughway 108 according to a trajectory 110. In some examples, a vehicle controller and/or a component thereof (e.g., a planning component) may be configured to determine the trajectory 110 associated with the vehicle. For example, the vehicle controller may determine a trajectory based at least partly on map data (e.g., following a roadway indicated by the map data), coordinate data (e.g., based on coordinates indicating a current position of the vehicle in an environment mapped to a global coordinate frame associated with the environment), sensor data (e.g., radar data, lidar data, etc. used to generate a more detailed representation of the environment), vehicle data (e.g., a current speed of the vehicle 106, a current pose of the vehicle 106 received from a localization component, etc.), and the like. In some examples, the trajectory 110 may correspond to a period of time and may be configured as predicted location(s) and/or pose(s) of the autonomous vehicle 106 at respective points in time of the period of time.

At operation 112, the process may include determining at least a portion of the trajectory 110 passed through a non-linear throughway 108. In some examples, a throughway 108 may include one or more non-linear portions. Additionally, or alternatively, at operation 112, the process may include determining that a portion of a throughway 108 is non-linear based at least in part on a characteristic of a shape of the non-linear portion of the throughway 108. For example, the process may include determining an arc of a shape of the throughway 108. In some examples, the process may include determining a degree of the arc of the shape of the non-linear throughway 108. Additionally, or alternatively, the process may include determining a length of the shape of the non-linear throughway 108. In some examples, a portion of a throughway 108 may be determined to be non-linear based on the arc, the degree of the arc, and/or the length of the shape.

At operation 114, the process may include determining a transformation based on a characteristic of a characteristic of a shape of the non-linear throughway 108. In some examples, the characteristic of the shape may include a arc of the shape, a degree of the arc, a length of the arc and/or shape, or the like. The characteristic may then be utilized to determine a transformation specific to the non-linear throughway 108. That is, individual transformations may be determined for respective portions of a throughway 108, based on the individual characteristics specific to the respective portions of the throughway 108.

As illustrated, the transformation 116 may be configured to transform individual cells of a rectangular occupancy grid 118 to a warped occupancy grid 120. In some examples, the transformation 116 may be determined using a conformal transformation algorithm, such as, for example, fractional linear transforms (e.g., a invertible mobius transformation algorithm), linear and square mappings, exponential and logarithmic mappings, and the like, allowing for accurate translation of data points from a portion of memory allocated to an occupancy grid 118 to a respective portion of a warped occupancy grid 120 associated with the environment 104. In some examples, the transformation 116 may be configured to transform points between an occupancy grid 118 that is allocated a portion of memory and a warped occupancy grid 120 that is associated with the environment 104 and/or fit to the non-linear throughway 108 which the vehicle 106 may traverse. By utilizing such a transformation, rectangular occupancy grids 118 may be used alongside a corresponding warped occupancy grid 120 and sensor data may be stored in a more compact manner, resulting in using less memory and reducing processing times by storing sensor data returns associated with the warped occupancy grid 120 in the portion of the memory allocated to the occupancy grid 118.

At operation 122, the process may include fitting a warped occupancy grid 120 to the non-linear throughway 108. In some examples, the warped occupancy grid 120 may be determined based on the throughway 108, such that the warped occupancy grid 120 may be fit to a portion of the non-linear throughway 108. In some examples, the cells of a warped occupancy grid may be non-polygonal (e.g., having one or more sides that includes a curve) and/or more correspond to a curvature of the non-linear throughway. Additionally, or alternatively, the warped occupancy grid 120 may be determined based on the trajectory 110, such that the warped occupancy grid 120 may be fit to the trajectory 110 of the autonomous vehicle 106. In some examples, the warped occupancy grid 120 may be comprised of portions, or chunks. The portions may be determined based on a curvature, a distance, and/or a period of time associated with the trajectory 110 and/or the non-linear throughway 108. Additionally, or alternatively, the portions may be determined based on a density of received data points (e.g., received from the planning component) associated with the autonomous vehicle 106. In some examples, the warped occupancy grid 120 may be represented as a two-dimensional warped occupancy grid 120 and/or a three-dimensional warped occupancy grid 120.

In some examples, a warped occupancy grid 120 may correspond to a collision avoidance corridor determined by a collision avoidance perception system and used to validate, reject, and/or replace a trajectory generated to control a vehicle. An example of such techniques for determining using a collision avoidance perception system to determine a collision avoidance corridor are discussed in, for example, U.S. patent application Ser. No. 16/588,529 titled "Collision Avoidance Perception System" and filed on Sep. 30, 2019, which is incorporated by reference herein in its entirety for all purposes.

As illustrated, a warped occupancy grid 120 may correspond to the roadway 108 of the environment 104. In some examples, a curved portion of a roadway 108 may be identified such that a warped occupancy grid 120 may be curved and fit to the curved portion of the roadway 108. For example, a constant arc may be determined for a curved portion of a roadway 108 and the length and/or degree of the arc may be used to determine a transformation used to fit a warped occupancy grid 120 to the curved portion of the roadway 108.

Additionally, or alternatively, the warped occupancy grid 120 may be fit to the trajectory 110 of the vehicle 106 traversing the environment 104. In some examples, a curved portion of a trajectory 110 may be identified such that a warped occupancy grid 120 may be curved and fit to the curved portion of the trajectory 110. For example, a constant arc may be determined for a curved portion of a trajectory 110 and the length and/or degree of the arc may be used to determine a transformation used to fit a warped occupancy grid 120 to the curved portion of the trajectory 110.

Figure 2A:
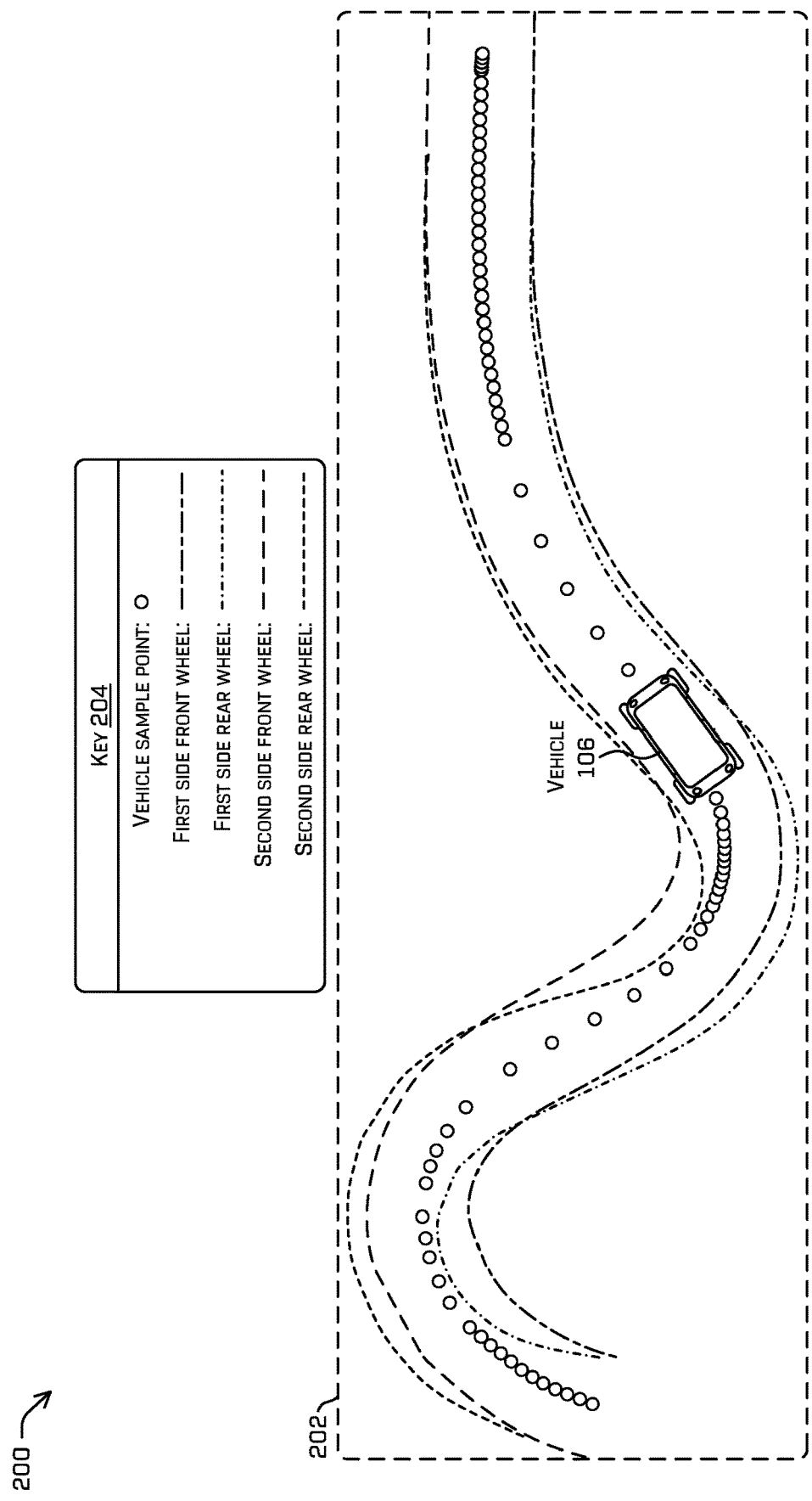
FIG. 2A illustrates a diagram for determining an example trajectory boundary of a trajectory of a vehicle traversing an environment.
Figure 2B:
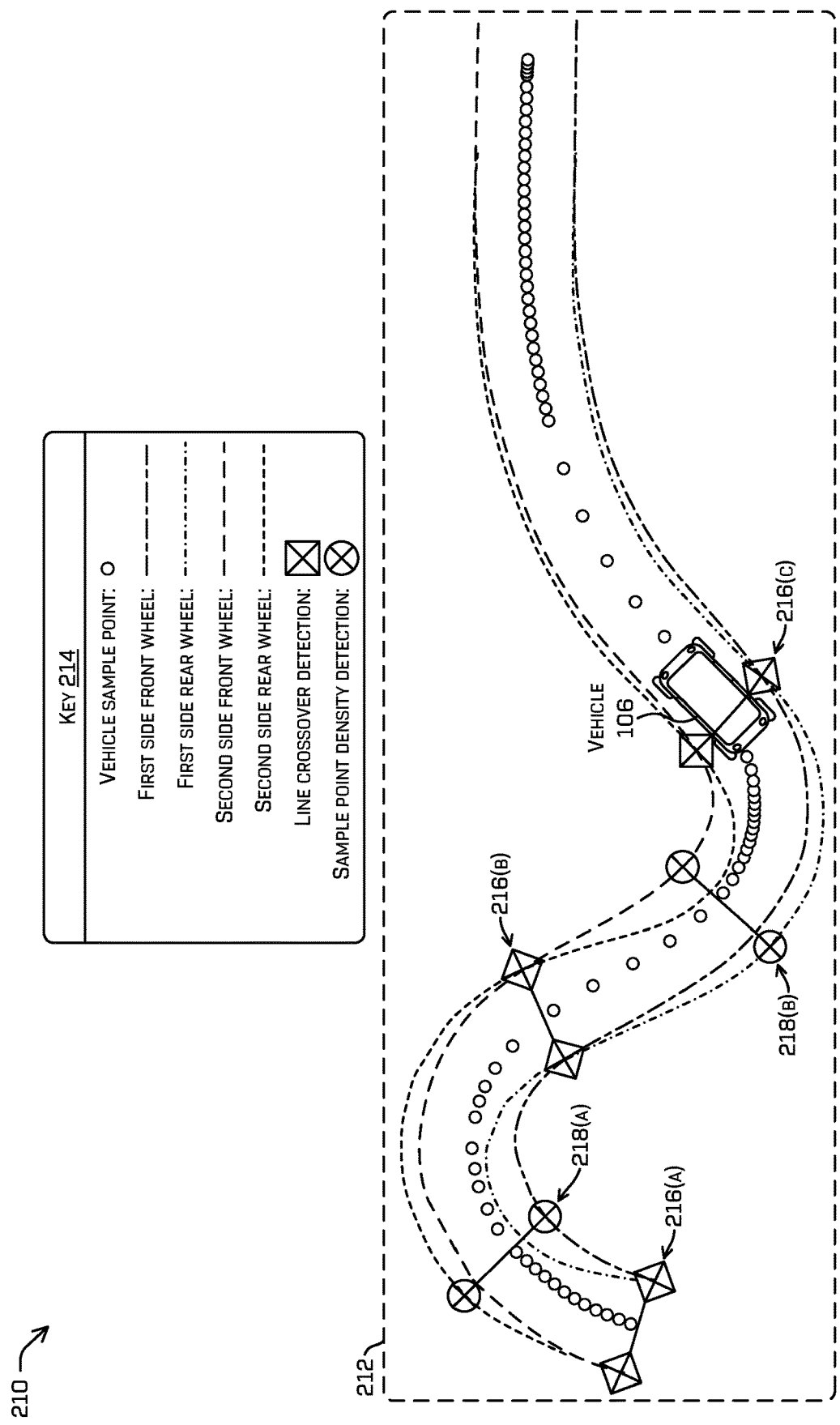
FIG. 2B illustrates a diagram for determining chunks of an example trajectory boundary of a trajectory of a vehicle traversing an environment, used to determine a portion of a warped occupancy grid.
Figure 2C:
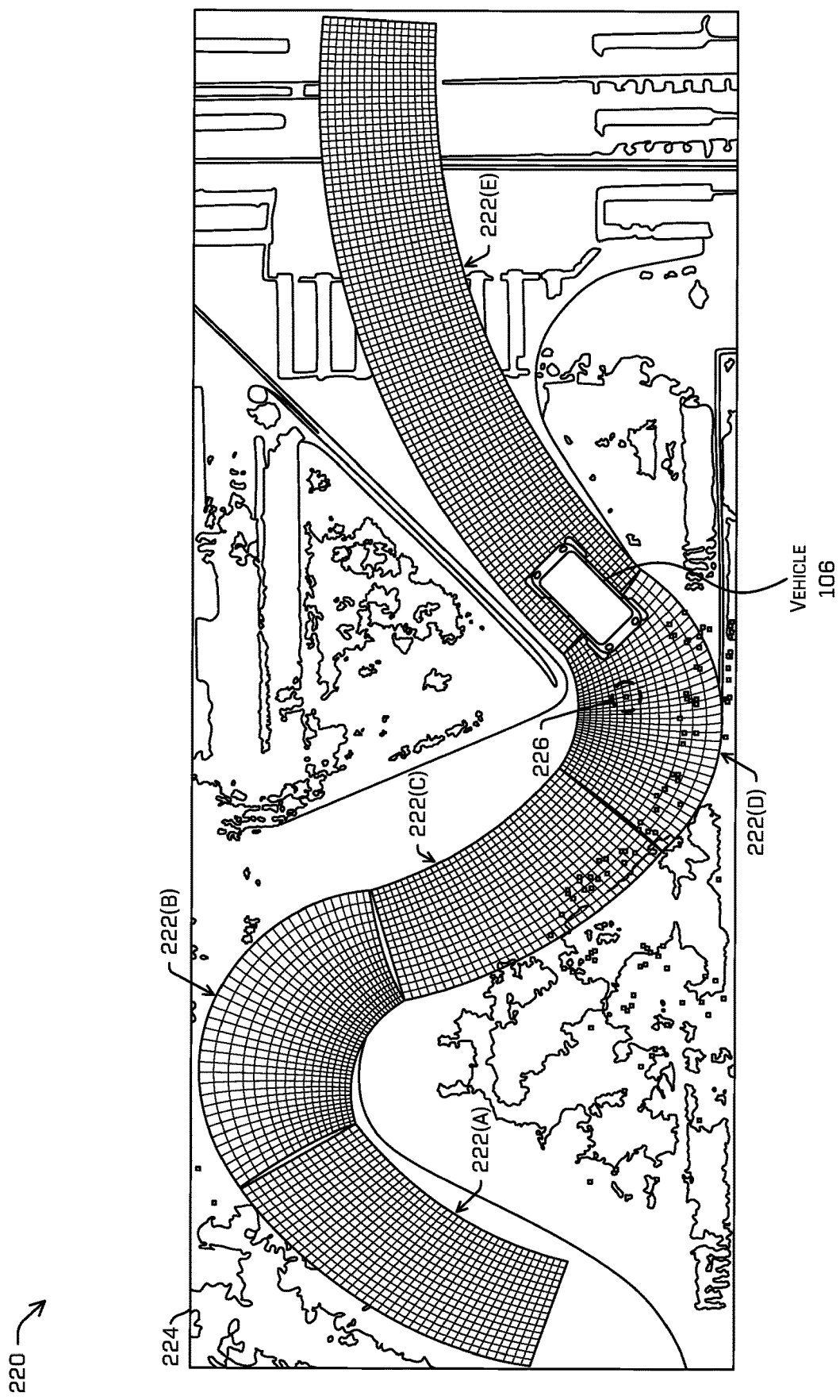
FIG. 2C illustrates a diagram of an example warped occupancy grid of an example environment fit to a trajectory of a vehicle traversing the environment.

As described in more detail with respect to FIGS. 2A-2C, portions of a trajectory 110 may correspond to respective portions of a roadway 108 and/or portions of a warped occupancy grid 120 associated with the environment 104 may correspond to respective portions of the roadway 108 and/or the trajectory 110 of the vehicle 106.

For example, a first portion of a trajectory 110 may correspond to a first portion of a roadway 108 that is substantially straight, such that a curvature of the first portion is determined to be below a threshold curvature, and a second portion of the trajectory 110 may correspond to a second portion of a roadway 108 that includes a substantial curve (e.g., a windy roadway 108), such that a curvature of the second portion is determined to be above a threshold curvature. As such, a first portion of a warped occupancy grid 120 associated with the environment 104 and corresponding to the first portion of the trajectory 110 may be determined and/or a second portion of a warped occupancy grid 120 associated with the environment 104 and corresponding to the second portion of the trajectory 110 may be determined. In some examples, the first portion may be joined to the second portion to form the warped occupancy grid 120 fit to the trajectory 110.

As previously described, the warped occupancy grid 120 may be fit to a trajectory 110 and/or a non-linear throughway 108. For example, individual portions of a warped occupancy grid 120 may correspond to respective portions of the trajectory 110 and/or the throughway 108 to more accurately fit the warped occupancy grid 120 to the curvature of the trajectory 110 and/or the throughway 108. In some examples, the width of individual portions of the warped occupancy grid 120 may be determined based on a width and/or aspect(s) associated with respective portions of a received trajectory 110. For example, a portion of the warped occupancy grid 120 may be determined to be near, and/or adjacent to, the vehicle 106 (e.g., at a longitudinal end of a vehicle 106, a side of the vehicle 106, and/or a combination thereof). In some examples, a first portion of the warped occupancy grid 120 may be determined to be continuous from a second portion of the warped occupancy grid 120, and may continue along the trajectory 110 (e.g., a warped occupancy grid 120 portion may correspond to a portion of the roadway 108 along the trajectory 110 predicted to be encountered by the vehicle 106 at a later time than another warped occupancy grid 120 portion). Additionally, or alternatively, a first portion of a warped occupancy grid 120 may be determined to be in front of the vehicle 106 (e.g., at a future predicted location of the vehicle) and substantially perpendicular from a second portion of the warped occupancy grid 120 and/or a portion of the trajectory 110 that corresponds to the second portion of the warped occupancy grid 120 (e.g., a warped occupancy grid 120 portion may correspond to a first roadway 108 that intersects with a second roadway 108 that the vehicle 106 is traversing according to the trajectory 110).

Additionally, or alternatively, the width of individual portions of the warped occupancy grid 120 may be determined based on information associated with the vehicle 106 and/or the environment 104. The information may be utilized to determine a bounding box associated with the vehicle 106. In some examples, a width associated with a warped occupancy grid 120 (or a portion thereof) may be determined based on a bounding box (e.g., a bounding box associated with the vehicle 106). Further, a trajectory 110 may be discretized, as described above (e.g., the portions of the trajectory 110). In some examples, a width of each of the warped occupancy grid 120 portion(s) may be determined based on a first width (e.g., a fixed width) and/or a second width based on a point associated with the bounding box and an edge of the portions of the trajectory 110 and/or a fixed distance, such as, for example a fixed distance associated with a type of the vehicle 106. An extent of a portion of a trajectory 110 may be determined based at least in part on speed limits, sensor ranges, previously observed objects in the area, and the like so as to limit the amount of processing performed in the safety system.

In some examples, expanding the width of a corridor associated with a trajectory (e.g., the warped occupancy grid 120) and/or a perpendicular corridor may be based on information associated with the vehicle 106 and/or the environment 104. An example of such techniques for expanding the width of a corridor are discussed in, for example, U.S. patent application Ser. No. 17/124,220 titled "Lateral Safety Area" and filed on Dec. 16, 2020, and U.S. patent application Ser. No. 17/124,237 titled "Determining Safety Area Based on Bounding Box" and filed on Dec. 16, 2020, which are incorporated by reference herein in its entirety for all purposes.

Additionally, or alternatively, at operation 122, the process may include allocating a portion of memory to an occupancy grid 118. In some examples, the occupancy grid 118 may be associated with the environment 104. In some examples, an occupancy grid 118 may include cells corresponding to a cartesian coordinate system. In some examples, an occupancy grid 118 may be represented as a two-dimensional occupancy grid having cells corresponding to a two-dimensional space (e.g., having two perpendicular coordinate axes, such as, for example an x-axis and a y-axis). Additionally, or alternatively, the occupancy grid may be represented as a three-dimensional occupancy grid having cells corresponding to a three-dimensional space (e.g., having three mutually perpendicular coordinate axes, such as, for example, an x-axis, a y-axis, and a z-axis). In some examples, the occupancy grid 118 may be configured to store sensor data and/or sensor data returns indicating an indication occupancy of a cell by an object in the environment 104.

As illustrated, a portion of memory 124 may be allocated to an occupancy grid 118. In some examples, the occupancy grid 118 may have cells that overlap with the roadway 108 and/or cells that fall outside of a boundary of the roadway 108. The occupancy grid 118 may be determined by a perception component and/or an occupancy grid component associated with the vehicle and/or the vehicle controller.

At operation 126, the process may include receiving sensor data from a sensor associated with the autonomous vehicle 106. In some examples, the sensor data may be radar data, lidar data, and/or any other three-dimensional data or data comprising a depth component. In some examples, the operation 126 may include receiving a plurality of sensor datasets from a plurality of sensors operating in connection with the perception system. In some instances, the operation 126 can include combining or fusing data from two or more sensors (and/or over a period of time) into a single sensor dataset (also referred to as a "meta spin"). In some instances, the operation 126 can include extracting a portion of the sensor data for processing, such as over a period of time. In some instances, the operation 126 can include receiving radar data (or other sensor data) and associating the radar data with the sensor data to generate a more detailed representation of an environment.

In some examples, the sensor data (e.g., sensor dataset(s)) can be associated with semantic information including, for example, one or more semantic classification(s), label(s), or segmentation information. An example of such techniques for determining and associating the sensor data with the semantic information are discussed in, for example, in U.S. patent application Ser. No. 15/820,245 titled "Sensor Data Segmentation" and filed Nov. 21, 2017, which is incorporated by reference herein in its entirety for all purposes.

The semantic information may be associated with static and/or dynamic objects in the environment 104 for classification and/or trajectory 110 planning. Portions of the environment 104 corresponding to a ground, static objects, and/or dynamic objects can be identified and labeled with such semantic information. In some examples, data can be segmented based at least in part on the semantic information. In some instances, a list of dynamic objects can be provided to a tracking system to track and/or predict a trajectory of each dynamic object over time. In some instances, a list of static objects and/or an identification of the ground can be provided to a planner system to generate a trajectory 110 for the vehicle that traverses a drivable surface and avoids or otherwise accounts for the static objects identified herein.

Additionally, or alternatively, at operation 126, the process may include associating the sensor data with the warped occupancy grid 120. That is, sensor data return points determined from the sensor data may be associated with individual cells of the warped occupancy grid 120.

As illustrated, an example 128 depicts the vehicle 106 capturing sensor data of an environment 104. In some examples, the sensor data may comprise lidar data, radar data, sonar data, time-of-flight data, or other depth data. For example, the operation 126 may include capturing image data and generating depth data based on the captured image data.

At operation 130, the process may include storing the lidar data in the warped occupancy grid 120. In some examples, storing the lidar data in the warped occupancy grid 120 may be achieved by storing the lidar data in the memory 124 allocated to the occupancy grid 118. In some examples, the transformation 116 may be used to store the sensor data, associated with the warped occupancy grid 120, in the memory 124 allocated to the occupancy grid 118. That is, the transformation 116 may transform points of the sensor data associated with cells of the warped occupancy grid 120 to corresponding cells of the occupancy grid 118. The sensor data corresponding to the cells of the occupancy grid 118 may then be stored in the portion of the memory 124 allocated to the occupancy grid 118. Additionally, or alternatively, at operation 130, the operation may include filtering the sensor data prior to and/or simultaneously with the storing of the sensor data (e.g., filtering the lidar data as a product of storing the lidar data). For example, since a cell of the warped occupancy grid 120 may correspond to a cell of a portion of the occupancy grid 118, the sensor data associated with the warped occupancy grid 120 may be stored in memory 124 (e.g., discrete memory) allocated to corresponding portions the occupancy grid 118.

As previously described, the vehicle 106 may receive and/or filter sensor data associated with an environment 104 through which the vehicle 106 is travelling. For example, since the warped occupancy grid 120 may be fit to a trajectory 110 of the vehicle 106 and/or a non-linear throughway 108 through which the vehicle 106 is traversing, the sensor data may be filtered to determine sensor data associated with portions of the occupancy grid 118 that correspond to the warped occupancy grid 120. Using these techniques the sensor data may be stored in a more compact manner, resulting in using less memory and reducing processing times since only sensor data returns that correspond to the trajectory 110 of the vehicle 106 (e.g., associated with the warped occupancy grid 120) are stored in the memory 124 allocated to the occupancy grid 118, and sensor data returns that would correspond to portions of the occupancy grid 118 that fall outside of the warped occupancy grid 120 may be ignored.

At operation 132, the process may include controlling the autonomous vehicle 106 based on the sensor data. As previously described, the memory 114 allocated to the occupancy grid 118 may store sensor data returns associated with the warped occupancy grid 120 indicating one or more detection(s) of an object in the environment 104. In some examples, the sensor data associated with the warped occupancy grid 120 may be utilized to determine an object associated with the warped occupancy grid 120 and determine any potential safety issues that may be associated with the vehicle trajectory 110 (e.g., potential collisions or otherwise) and/or to invoke any safety actions (e.g., updating a maneuver, invoking an emergency stop, etc.). In some examples, the detection(s) may correspond to static and/or dynamic objects.

Since the warped occupancy grid 120 can be fit to the trajectory 110 of the vehicle 106 that is traversing the roadway 108 of the environment 104, a detection of an object may result in a new trajectory 110 being generated to avoid a potential collision with the object. In some examples, a new trajectory 110 may be generated for the vehicle 106 based on such a detection, and the process described herein may be repeated such as to determine a new warped occupancy grid 120 fit to the new trajectory based on the previous occupancy grid 120 and/or the occupancy grid 118. Additionally, or alternatively, the trajectory 110 may be continuously updated so that the vehicle 106 continues to traverse the environment 104 as needed, and additional portions may be added onto the existing warped occupancy grid 120 as the trajectory 110 is updated and/or is further generated.

FIG. 2A is a diagram 200 of an example trajectory boundary 202 of a trajectory of a vehicle 106 traversing an environment. In some examples, a warped occupancy grid, such as, for example, the warped occupancy grid 120 as described with respect to FIG. 1, may be fit to a vehicle trajectory based on a determined trajectory boundary 202. Additionally, or alternatively, a width of a warped occupancy grid (or a portion thereof) may be determined based on a trajectory boundary 202.

As illustrated in FIG. 2A, a trajectory boundary 202 may be comprised of various data points associated with a vehicle 106 navigating an environment according to a trajectory. Examples of such data points may be indicated by the key 204, such as, for example, a sample point associated with a vehicle 106 (e.g., at a center point of the vehicle), an indication of the first side (e.g., a driver side) front wheel of the vehicle 106, an indication of the first side rear wheel of the vehicle 106, an indication of the second side (e.g., a passenger side) front wheel of the vehicle 106, and/or an indication of the second side rear wheel of the vehicle 106. In some examples, a location of these indications may be recorded and mapped with respect to the environment in which the vehicle 106 is traversing, a map associated with the environment, a roadway associated with the environment, a trajectory of the vehicle, and the like.

In some examples, a portion of an occupancy grid of an environment may be transformed to fit the trajectory boundary 202 associated with a trajectory of a vehicle 106 traversing the environment. In some examples, the warped occupancy grid may be fit to the trajectory based on a first side boundary and/or a second side boundary of the trajectory boundary 202. For example, at every point along a vehicle trajectory, the first side front wheel and the first side rear wheel locations may be recorded, and the widest of the two may be configured as the first side boundary. At each point, the furthest of a first side distance (e.g., a first distance) from a center point of the vehicle 106 (e.g., the sample point of the vehicle or the like) outward to the first side front wheel and a first side distance (e.g., a second distance) from the center point of the vehicle 106 outward to the first side rear wheel may be configured as the first side boundary of the trajectory boundary 202. Additionally, or alternatively, at every point along a vehicle trajectory, the second side front wheel and the second side rear wheel locations may be recorded, and the widest of the two may be configured as the second side boundary. At each point, the furthest of a second side distance (e.g., a third distance) from a center point of the vehicle 106 outward to the second side front wheel and a second side distance (e.g., a fourth distance) from the center point of the vehicle 106 outward to the second side rear wheel may be configured as the second side boundary of the trajectory boundary 202. The trajectory boundary 202 may then be determined using the first side boundary and/or the second side boundary.

FIG. 2B is a diagram 210 of an example discretized trajectory boundary 212 of a trajectory of a vehicle 106 traversing an environment including chunks used to determine respective portions of a warped occupancy grid. In some examples, a portion of a warped occupancy grid, such as, for example, the warped occupancy grid 120 as described with respect to FIG. 1, may be determined based on the discretized trajectory boundary 212. Additionally, or alternatively, a width of portions of a warped occupancy grid (or a portion thereof) may be determined based on the discretized trajectory boundary 212.

As illustrated in FIG. 2B, a discretized trajectory boundary 212 may be comprised of various data points associated with a vehicle 106 navigating an environment according to a trajectory. Examples of such data points may be indicated by the key 214, such as, for example, a sample point associated with a vehicle 106 (e.g., at a center point of the vehicle), an indication of the first side (e.g., driver side) front wheel of the vehicle 106, an indication of the first side rear wheel of the vehicle 106, an indication of the second side (e.g., passenger side) front wheel of the vehicle 106, an indication of the second side rear wheel of the vehicle 106, an indication of a line crossover detection, and/or an indication of a sample point density detection.

An indication of a line crossover detection may indicate a portion of a trajectory causing a vehicle to turn at least a threshold amount (e.g., a point between a substantially straight portion of a trajectory changing to a portion of a trajectory having a substantial curve or a point between a portion of trajectory having a substantial curve changing to a substantially straight portion of a trajectory), which may provide an indication of a boundary of a chunk of a warped occupancy grid. In some examples, a line crossover boundary 216 may be determined based on two respective line crossover detections. For example, an indication of a line crossover detection may correspond to a point of the discretized trajectory boundary 212 in which a location of the first side front wheel overlaps with a location of the first side rear wheel (e.g., line crossover boundary 216(*b*) where the first side front wheel boundary becomes closer to the middle of the trajectory than the first side rear wheel boundary) and/or a point of the discretized trajectory boundary 212 in which a location of the second side rear wheel overlaps with a location of the second side front wheel (e.g., line crossover boundary 216(*c*) where the second side rear wheel boundary becomes closer to the middle of the trajectory than the second side front wheel boundary).

An indication of a sample point density detection may correspond to a point of the discretized trajectory boundary 212 in which a density of the sample points between front wheels of the vehicle changes (e.g., from low density to high density or from high density to low density) and/or satisfies a threshold density (e.g., a, which may provide an indication of a boundary of a chunk of a warped occupancy grid. In some examples, a point density boundary 218 may be determined based on two respective point density detections. For example, an indication of a point density detection may correspond to a point of the discretized trajectory boundary 212 in which the sample points of a vehicle 106 change from a substantially high-density portion to a substantially low-density portion (e.g., point density boundary 218(*b*)) and/or a point of the discretized trajectory boundary 212 in which the sample points of a vehicle 106 change from a substantially low-density portion to a substantially high density portion (e.g., point density boundary 218(*a*)).

As previously described, a sample point density detection may be determined based on point(s) of the discretized trajectory boundary 212 in which a density of the sample points of the vehicle changes (e.g., from low density to high density or from high density to low density) and/or satisfies a threshold density (e.g., a, which may provide an indication of a boundary of a chunk of a warped occupancy grid. An example of such techniques for determining sample point density are discussed in, for example, U.S. patent application Ser. No. 16/179,679 titled "Adaptive Scaling in Trajectory Generation" and filed on Nov. 2, 2018, which is incorporated by reference herein in its entirety for all purposes.

The example boundaries 216, 218 illustrated in FIG. 2B may then be utilized to fit portions of a warped occupancy grid to the trajectory, as previously described with respect to FIG. 1. An example of corresponding portions of a warped occupancy grid may be depicted by FIG. 2C.

FIG. 2C is a diagram 220 of example portions of a warped occupancy grid 222 of an example environment fit to a trajectory of a vehicle 106 traversing an environment 224.

As illustrated by FIG. 2C, a warped occupancy grid may be comprised of one or more portions 222(*a*)-222(*e*). As previously described with respect to FIG. 1, a warped occupancy grid associated with an environment 224 may be determined and/or fit to a trajectory of a vehicle 106 traversing the environment 224 based on a curvature of a trajectory and/or roadway, a period of time associated with a trajectory, a speed and/or pose associated with a vehicle, and/or the like. Additionally, or alternatively, a portion of a warped occupancy grid 222 may be determined and/or fit to a trajectory of a vehicle 106 based on one or more line crossover boundaries 216 and/or one or more point density boundaries 218 determined with respect to a discretized trajectory boundary 212, as described with respect to FIG. 2A.

For example, a first portion of the warped occupancy grid 222(*a*) may be determined and/or fit to a trajectory of a vehicle 106 based on a first line crossover boundary 216(*a*) and a first point density boundary 218(*a*). Additionally, or alternatively, a second portion of the warped occupancy grid 222(*b*) may be determined and/or fit to a trajectory of a vehicle 106 based on a first point density boundary 218(*a*) and a second line crossover boundary 216(*b*). Additionally, or alternatively, a third portion of the warped occupancy grid 222(*c*) may be determined and/or fit to a trajectory of a vehicle 106 based on a second line crossover boundary 216(*b*) and a second point density boundary 218(*b*). Additionally, or alternatively, a fourth portion of the warped occupancy grid 222(*d*) may be determined and/or fit to a trajectory of a vehicle 106 based on a second point density boundary 218(*b*) and a third line crossover boundary 216(*c*). Additionally, or alternatively, a fifth portion of the warped occupancy grid 222(*e*) may be determined and/or fit to a trajectory of a vehicle 106 based on a third line crossover boundary 216(*c*) and a beginning of the vehicle trajectory (as illustrated) or an end of the vehicle trajectory.

Further, the individual portions 222 may be fit together at the ends, as illustrated, to form a warped occupancy grid. For example, tan end of a portion 222 may be curved such that the ends of two respective portions (e.g., 222(*b*) and 222(*c*)) may not algin in a perfectly parallel manner. In some examples, these portions 222 may be determined and/or configured such that one of the portions overlaps one of more neighboring portion 222 by an amount sufficient to cover any gaps between the portions 222. Additionally, or alternatively, these portions 222 may be determined and/or configured such that a gap between respective portions 222 is small enough to be negligible to the techniques described herein. Additionally, or alternatively, the respective ends of two portions 222 being joined together to form the warped occupancy grid may be further warped such that the respective ends become fit to one another (e.g., parallel to one another such that they properly align without a gap). In some examples, this may be achieved using a deformation function, such as, for example, a thin plate spline function, a radial basis function deformation, a b-spline deformation, an elastic deformation, a harmonic deformation, and the like.

As described with respect to FIG. 1, sensor data returns 226 may be associated with the portions of the warped occupancy grid 222. Additionally, or alternatively, the sensor data returns 226 may be stored in memory allocated to an occupancy grid by determining a transformation between the warped occupancy grid 222 and the occupancy grid. In some examples, the sensor data returns 226 may indicate a detection of an object. One or more sensor data returns 226 may be analyzed alone or in combination with one another to determine a detection of an object in the environment 224.

Figure 3:
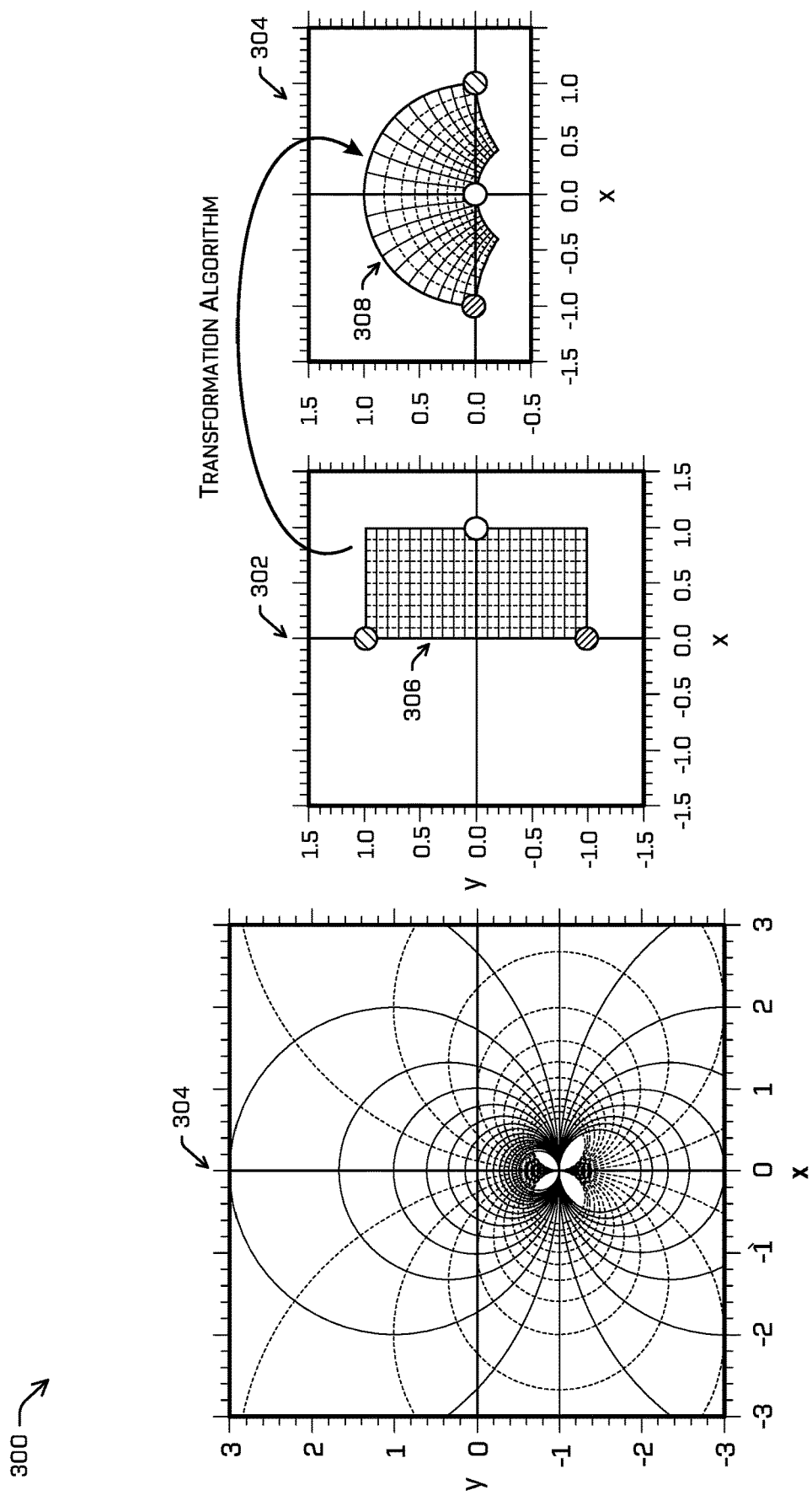
FIG. 3 depicts example coordinate spaces for translating points of an occupancy grid to points of a warped occupancy grid.

FIG. 3 is a diagram 300 of example coordinate spaces for translating points of an occupancy grid to points of a warped occupancy grid.

In some examples, an occupancy grid and/or a warped occupancy grid may be configured as a two-dimensional occupancy grid having cells corresponding to a two-dimensional space (e.g., having two perpendicular coordinate axes, such as, for example an x-axis and a y-axis). Additionally, or alternatively, the occupancy grid and/or warped occupancy grid may be configured as a three-dimensional occupancy grid having cells corresponding to a three-dimensional space (e.g., having three mutually perpendicular coordinate axes, such as, for example, an x-axis, a y-axis, and a z-axis). In some examples, the occupancy grid may be configured to store sensor data and/or sensor data returns associated with the warped occupancy grid and indicating an indication occupancy of a cell by an object in the environment 104.

In some examples, an occupancy grid may be plotted on and/or represented by a traditional Cartesian coordinate plane 302. Additionally, or alternatively, the occupancy grid may correspond to a portion of a memory space configured to store sensor data. In some examples, a warped occupancy grid may be plotted on and/or represented by a warped coordinate plane 304. A transformation may be determined between points of an occupancy grid, represented by a cartesian coordinate plane 302, and points of a warped occupancy grid represented by a warped coordinate plane 304 using a conformal transformation algorithm, such as, for example, fractional linear transforms (e.g., an invertible mobius transformation algorithm), linear and square mappings, exponential and logarithmic mappings, and the like. By utilizing such a transformation, rectangular occupancy grids 306 may be used alongside a corresponding warped occupancy grid 308 and may allow for the warped occupancy grid 308 to ultimately be processed by other components of a system in a similar manner as the rectangular occupancy grid 306. In this manner, vehicle component (e.g., planner component) that have been configured to use rectangular occupancy grids may use grids generated using the techniques disclosed herein using, for example, the disclosed transforms.

As illustrated by FIG. 3, a portion of an occupancy grid 306 (having a portion of memory allocated thereto) represented in a cartesian coordinate plane may be transformed, using the transformation algorithm, into a portion of a warped occupancy grid 308 represented in the warped coordinate plane 304. In some examples, the portion of the warped occupancy grid 308 may correspond to the portion(s) of the warped occupancy grid 222 as described with respect to FIG. 2C. The individual cells of the occupancy grid 306 may map to the respective individual cells of a portion of the warped occupancy grid 308, such that the warped occupancy grid may be fit to the trajectory of a vehicle (e.g., to match the curvature of a roadway) and stored in the same portion of memory that corresponds to the portion of the occupancy grid 306.

Figure 4:
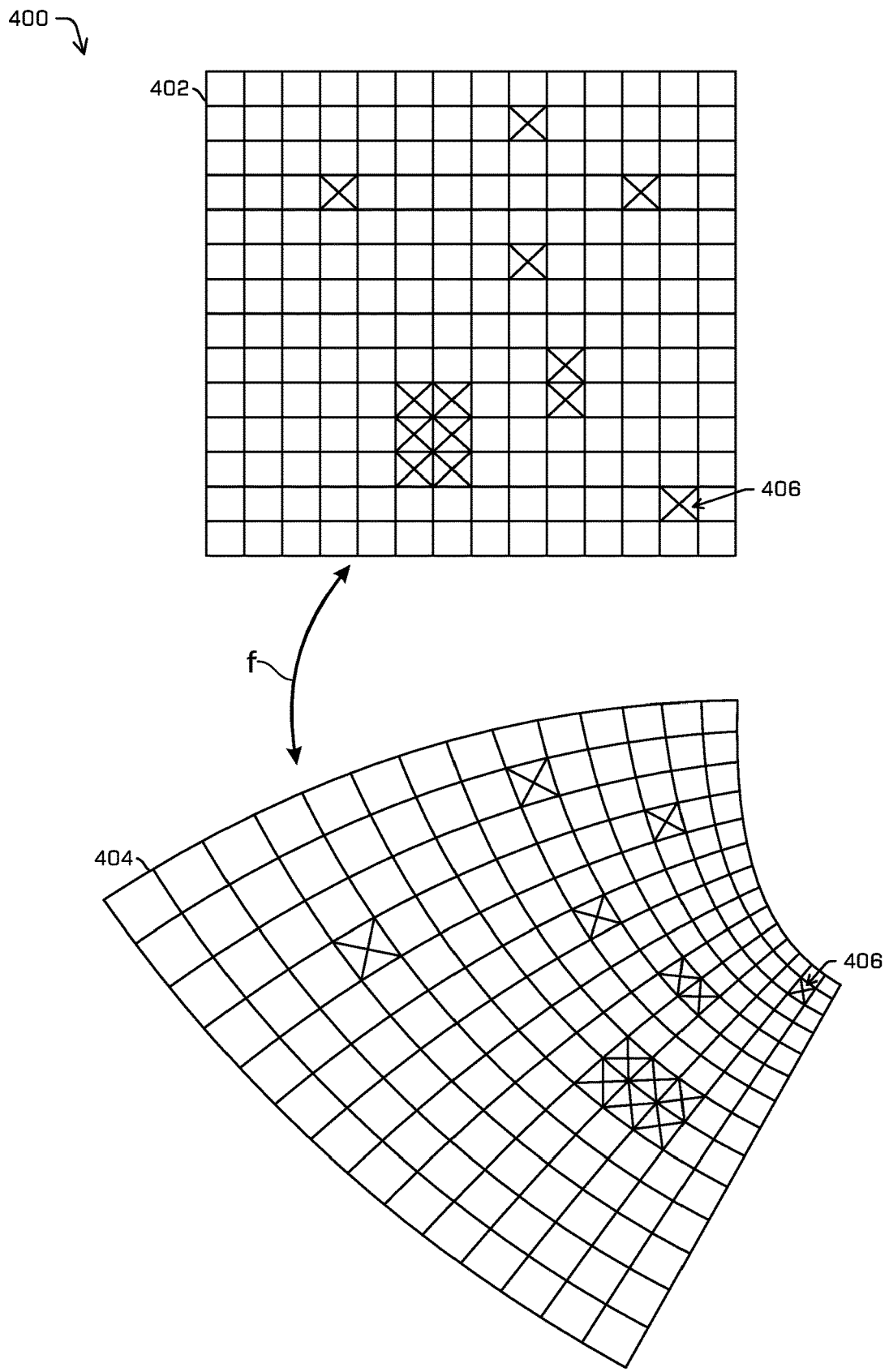
FIG. 4 depicts an example transformation between points of a portion of an occupancy grid associated with a portion of memory and points of a portion of a warped occupancy grid associated with an environment.

FIG. 4 is a diagram 400 of example points of a portion of an occupancy grid 402 translated to a portion of a warped occupancy grid 404. In some examples, the occupancy grid 402 may correspond to the occupancy grid 116 as described with respect to FIG. 1, and the warped occupancy grid 404 may correspond to the warped occupancy grid 120 and/or the portions of the warped occupancy grid 222, 308 as described with respect to FIGS. 1, 2C, and 3, respectively. Additionally, or alternatively, the occupancy grid 402 may represent a portion of a memory space and/or the warped occupancy grid 404 may represent the environment in which a vehicle is traversing according to a trajectory.

As illustrated in FIG. 4, the occupancy grid 402 may be allocated a portion of memory to store one or more sensor return points 406 (e.g., lidar return points) detected by a sensor of an autonomous vehicle traversing an environment. As previously described, a transformation may be determined between the occupancy grid 402 and a warped occupancy grid 404. As such, the one or more sensor return points associated with the warped occupancy grid 404 may be transformed to respective locations of the cells occupancy grid 402 allocated the portion of memory for storage. Additionally, or alternatively, the transformation may be determined using an invertible transformation algorithm, configured to preserve the respective locations of the sensor return points 406 associated with the cells of the warped occupancy grid 404 with respect to the cells of the warped occupancy grid 404.

Figure 5:
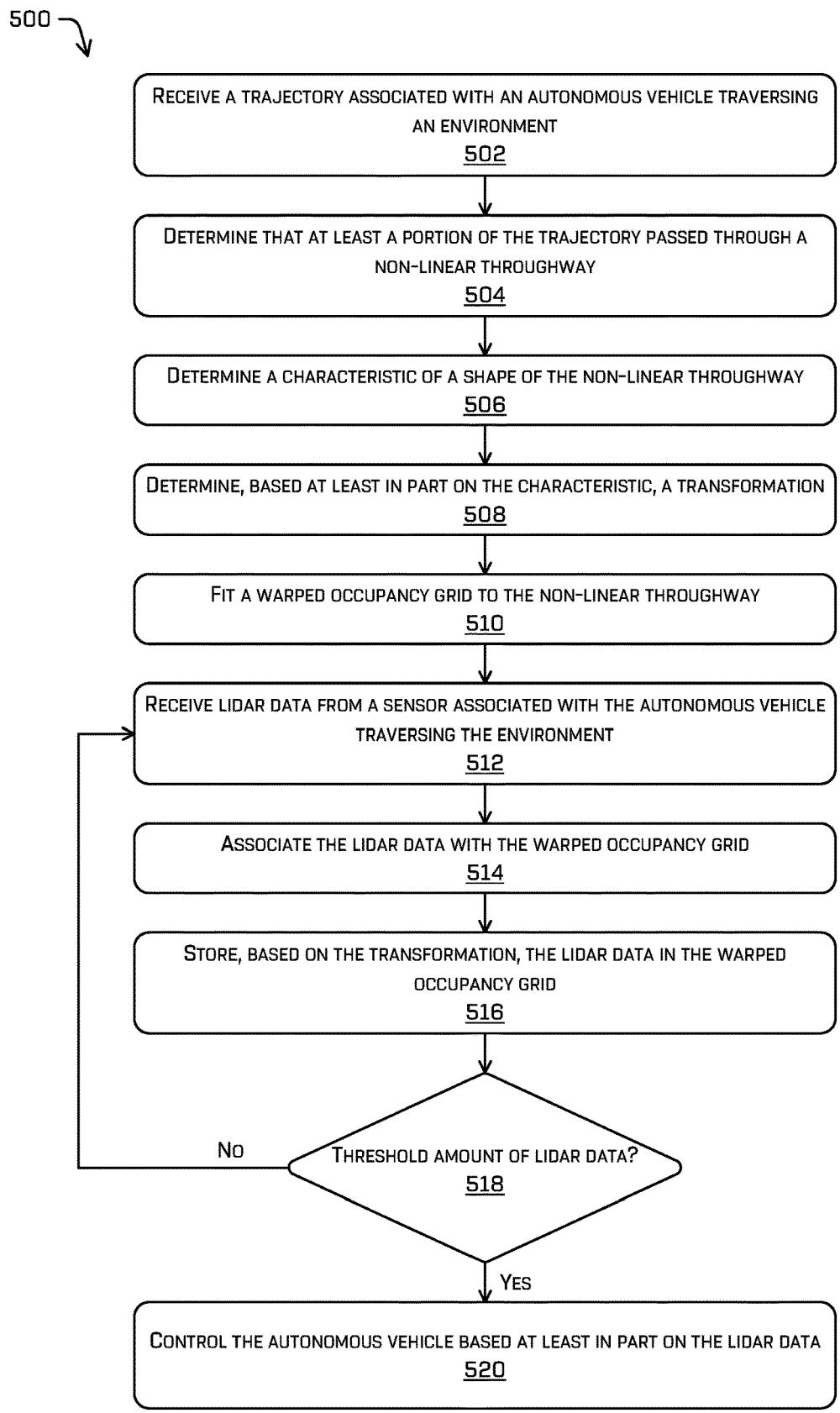
FIG. 5 illustrates an example process for determining a transformation based on a non-linear throughway that is passed through by a trajectory of a vehicle and fitting a warped occupancy grid, determined based on the transformation, to the non-linear throughway.

FIGS. 1 and 5 illustrate example process(es) in accordance with examples of the disclosure. The process(es) are illustrated as a logical flow graph, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 5 illustrates an example process 500 for determining a transformation based on a non-linear throughway that is passed through by a trajectory of a vehicle traversing the environment passes through and fitting a warped occupancy grid to the non-linear throughway. In some examples, the warped occupancy grid, the trajectory, and/or the vehicle may correspond to the warped occupancy grid 120, the trajectory 110, and/or the vehicle 106, as described with respect to FIG. 1, respectively. Additionally, or alternatively, the warped occupancy grid may be comprised of one or more portions, or chunks, such as, for example, the portions of the warped occupancy grid 222, 308, and/or 404, as described with respect to FIGS. 2C, 3, and 4, respectively.

The process 500 begins at operation 502 and includes receiving a trajectory associated with an autonomous vehicle traversing an environment. In some examples, the trajectory may be received from a planning component and/or one or more sensors of the autonomous vehicle (e.g., wheel encoders, GPS, etc.). Additionally, or alternatively, the trajectory may be configured to cause the autonomous vehicle to traverse a roadway of the environment.

At operation 504, the process 500 may include determining that at least a portion of the trajectory passed through a non-linear throughway. In some examples, a non-linear throughway may include a throughway having an arc and/or a curvature that satisfies a threshold arc and/or curvature.

At operation 506, the process 500 may include determining a characteristic of a shape of the non-linear throughway. In some examples, the shape of the non-linear throughway may include an arc. Additionally, or alternatively, the characteristic of the shape may include a degree of the arc and/or a length of the arc and/or shape.

At operation 508, the process 500 may include determining a transformation based at least in part on the characteristic of the shape of the non-linear throughway. In some examples, the transformation may be determined using a conformal transformation algorithm, such as, for example, fractional linear transforms (e.g., a invertible mobius transformation algorithm), linear and square mappings, exponential and logarithmic mappings, and the like, allowing for accurate translation of data points from the portion of memory allocated to a traditional rectangular occupancy grid to a respective portion of a warped occupancy grid associated with the environment.

At operation 510, the process 500 may include fitting a warped occupancy grid to the non-linear throughway. In some examples, the warped occupancy grid may be based at least in part on the transformation. Additionally, or alternatively, the warped occupancy grid may include non-polygonal cells (e.g., cells having at least one side with curvature) corresponding to the non-linear throughway.

At operation 512, the process 500 may include receiving lidar data from a sensor associated with the autonomous vehicle traversing the environment. Additionally, or alternatively, the lidar data may be any other form of sensor data, such as, for example, radar data, sonar data, time-of-flight data, or any other depth data. Additionally, or alternatively, the lidar data may be received from one or more additional sensors associated with the autonomous vehicle.

At operation 514, the process 500 may include associating the lidar data with the warped occupancy grid. In some examples, sensor data return points indicated by the sensor data may be associated with individual cells of the warped occupancy grid. Additionally, or alternatively, associating the lidar data with the warped occupancy grid may provide an indication of detections of objects in the environment and/or in a path of the trajectory of the autonomous vehicle.

At operation 516, the process 500 may include storing the lidar data in the warped occupancy grid. In some examples, storing the lidar data in the warped occupancy grid may be based at least in part on the transformation. Additionally, or alternatively, the operation 516 may include filtering the lidar data prior to and/or simultaneously with the storing of the lidar data (e.g., filtering the lidar data as a product of storing the lidar data). For example, a cell of the portion of an occupancy grid stored in memory may correspond to a cell of the warped occupancy grid. That is, the lidar data associated with the cell(s) of the warped occupancy grid may be stored in the portion of the memory allocated to the occupancy grid. In some examples, the transformation may be used to store the lidar data, associated with the warped occupancy grid, in the memory allocated to the occupancy grid. That is, the transformation may transform points of the sensor data associated with cells of the warped occupancy grid to corresponding cells of the occupancy grid.

At operation 518, the process 500 may include determining whether a threshold amount of lidar data, associated with the warped occupancy grid, has been received and/or is stored in the warped occupancy grid. For example, the lidar data that is stored in the warped occupancy grid may be used to identify detections of objects in the environment, specifically in line of the non-linear throughway and/or trajectory of the vehicle. By way of example, the operation 518 may include determining that a threshold amount of lidar data has been received and/or is stored in the warped occupancy grid. By way of another example, the operation 518 may determine that a threshold amount of lidar data has not been received and/or is not stored in the warped occupancy grid. The process 500 may subsequently include the operation 512 to restart a portion of the process 500, based on determining that a threshold amount of lidar data has not been received and/or is not stored in the warped occupancy grid.

At operation 520, the process 500 may include controlling the autonomous vehicle based at least in part on the lidar data. In some examples, the lidar data returns associated with the warped occupancy grid may indicate one or more detection(s) of an object in the environment. In some examples, the lidar data may be utilized to determine an object associated with the warped occupancy grid and determine any potential safety issues that may be associated with the vehicle trajectory (e.g., potential collisions or otherwise) and/or to invoke any safety actions (e.g., updating a maneuver, invoking an emergency stop, etc.). In some examples, the detection(s) may correspond to static and/or dynamic objects.

In some examples, the transformation may be based at least in part on a conformal transform algorithm.

Additionally, or alternatively, the process 500 may include determining a width associated with the autonomous vehicle. In some examples, the width of the warped occupancy grid may be determined based on information associated with the vehicle and/or the environment. Additionally, or alternatively, the process 500 may include determining a buffer associated with the autonomous vehicle based at least in part on the environment. Additionally, or alternatively, the process 500 may include fitting the warped occupancy grid to the non-linear throughway based at least in part on the width and the buffer associated with the autonomous vehicle.

Additionally, or alternatively, the process 500 may include determining an arc of the shape of the non-linear throughway. Additionally, or alternatively, the process 500 may include determining that a degree of the arc is greater than a threshold degree. Additionally, or alternatively, the process 500 may include determining the transformation based at least in part on the degree of the arc of the shape of the non-linear throughway being greater than the threshold curvature.

Additionally, or alternatively, the process 500 may include determining a size of the warped occupancy grid based at least in part on at least one of a distance associated with at least the non-linear throughway and/or a time period associated with the autonomous vehicle traversing at least the non-linear throughway.

Additionally, or alternatively, the process 500 may include determining an arc of the non-linear portion of the area. Additionally, or alternatively, the process 500 may include determining a characteristic of the arc of the non-linear portion of the area, wherein the characteristic includes at least one of a degree of the arc and/or a length of the arc. Additionally, or alternatively, the process 500 may include determining, based at least in part on the arc and the characteristic, the transformation. Additionally, or alternatively, the process 500 may include determining the warped occupancy grid based at least in part on the transformation. Additionally, or alternatively, the process 500 may include fitting the warped occupancy grid to the non-linear portion of the area, wherein the warped occupancy grid includes non-polygonal cells corresponding to the non-linear portion of the area.

In some examples, the non-liner throughway may be a first non-linear throughway, the warped occupancy grid may be a first warped occupancy grid associated with the first non-linear throughway, and the transformation may be a first transformation. Additionally, or alternatively, the process 500 may include determining, based at least in part on a second non-linear throughway to be traversed by the vehicle, a second warped occupancy grid. Additionally, or alternatively, the process 500 may include aligning the second warped occupancy grid to an end of the first warped occupancy grid based at least in part on a deformation function. Additionally, or alternatively, the process 500 may include determining a second transformation associated with the second warped occupancy grid. Additionally, or alternatively, the process 500 may include associating the sensor data with the second warped occupancy grid. Additionally, or alternatively, the process 500 may include storing, based on the transformation, the sensor data in the second warped occupancy grid. Additionally, or alternatively, the process 500 may include controlling the vehicle based at least in part on the sensor data stored in the second occupancy grid.

In some examples, the portion of the memory allocated to the occupancy grid may be discrete memory.

Figure 6:
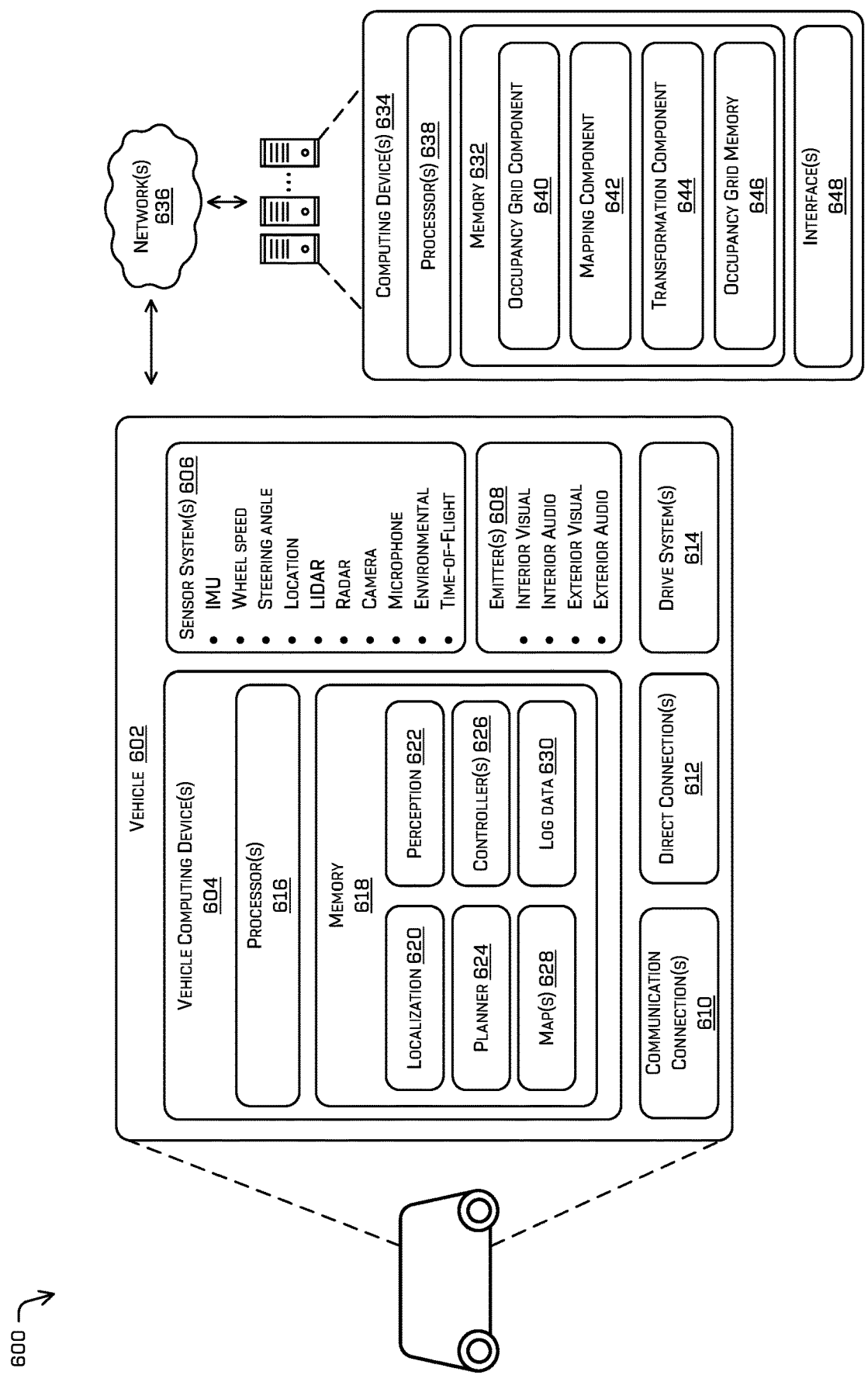
FIG. 6 is a block diagram of an example system for implementing the techniques described herein.

FIG. 6 is a block diagram of an example system 600 for implementing the techniques described herein. In at least one example, the system 600 may include a vehicle 602, such as vehicle 106.

The vehicle 602 may include a vehicle computing device 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the one or more processors 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In the illustrated example, the memory 618 of the vehicle computing device 604 stores a localization component 620, such as localization component 620, a perception component 622, a planner component 624, one or more system controllers 626, one or more maps 628, and log data 630. Though depicted in FIG. 6 as residing in the memory 618 for illustrative purposes, it is contemplated that the localization component 620, the perception component 622, the planner component 624, the system controller(s) 626, and the map(s(628 may additionally, or alternatively, be accessible to the vehicle 602 (e.g., stored on, or otherwise accessible by, memory remote from the vehicle 602, such as, for example, on memory 632 of a computing device 634). As described herein, the localization component 620, the perception component 622, the planner component 624, the system controller(s) 626, may be collectively comprise a vehicle controller.

In at least one example, the localization component 620 may include functionality to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for generating a path polygon associated with the vehicle path, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.).

In additional or alternative examples, the perception component 622 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planner component 624 may determine a path for the vehicle 602 to follow to traverse through an environment. For example, the planner component 624 may determine various routes and trajectories and various levels of detail. For example, the planner component 624 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 624 may generate an instruction for guiding the vehicle 602 along at least a portion of the route from the first location to the second location. In at least one example, the planner component 624 may determine how to guide the vehicle 602 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In some examples, the planner component 624 may include a prediction component to generate predicted trajectories of objects in an environment. For example, a prediction component may generate one or more predicted trajectories for objects within a threshold distance from the vehicle 602. In some examples, a prediction component may measure a trace of an object and generate a trajectory for the object based on observed and predicted behavior.

In at least one example, the vehicle computing device(s) 604 may include one or more system controllers 626, which may be configured to control steering, propulsion, braking, safety, emitters, communication, and other systems of the vehicle 602. The system controller(s) 626 may communicate with and/or control corresponding systems of the drive system(s) 614 and/or other components of the vehicle 602.

The memory 618 may further include one or more maps 628 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the maps 628. That is, the maps 628 may be used in connection with the localization component 620, the perception component 622, and/or the planner component 624 to determine a location of the vehicle 602, detect objects in an environment, and/or generate routes and/or trajectories to navigate within an environment. Additionally, in some examples, the maps 628 may be used in connection with a tracker component to determine a position and/or orientation of the vehicle with respect to a planned trajectory, such as based on steering angles, velocities, accelerations, drive direction, drive gear, and/or gravity acceleration.

In some examples, the one or more maps 628 may be stored on a computing device(s) (such as the computing device(s) 634) accessible via network(s) 636. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

As illustrated in FIG. 6, the memory 618 may store log data 630. The log data 630 may represent data input and/or output by each of the localization component 620, the perception component 622, the planner component 624, the controller(s) 626, and/or outputs of various subcomponents thereof. In at least one example the log data 630 may include sensor data captured and provided to one or more of the components of the vehicle computing device(s) 604 by the sensor systems 606.

As can be understood, the components discussed herein (e.g., the localization component 620, the perception component 622, the planner component 624, the one or more system controllers 626, and the one or more maps 628 are described as divided for illustrative purposes. However, the operations performed by the various components may be combined or performed in any other component. For example, in the illustrative example, the functions of a tracker component as described above may be performed by the planner component 624. However, in other examples, the tracker component may include a separate component independent of the planner component 624.

In some instances, aspects of some or all of the components discussed herein may include any models, techniques, and/or machine learning techniques. For example, in some instances, the components in the memory 618 (and the memory 632, discussed below) may be implemented as a neural network.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device(s) 604. Additionally, or alternatively, the sensor system(s) 606 may send sensor data, via the one or more networks 636, to the one or more computing device(s) 634 at a particular frequency, after a lapse of a predetermined period of time, in near real-time, etc.

The vehicle 602 may also include one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connection(s) 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., computing device(s) 634, other nearby vehicles, etc.) and/or one or more remote sensor system(s) for receiving sensor data.

The communications connection(s) 610 may include physical and/or logical interfaces for connecting the vehicle computing device 604 to another computing device or a network, such as network(s) 636. For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration associated with the drive systems, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle 602. In some instances, the direct connection 612 may further releasably secure the drive system(s) 614 to the body of the vehicle 602.

In at least one example, the localization component 620, the perception component 622, the planner component 624, and/or the one or more system controllers 626, and/or various components thereof, may process sensor data, as described above, and may send their respective outputs as log data 630, over the one or more network(s) 636, to the computing device(s) 634. In at least one example, the vehicle computing device(s) 604 may send the log data 630 to the computing device(s) 634 at a particular frequency, after a lapse of a predetermined period of time, in near real-time, etc.

In some examples, the vehicle 602 may send sensor data to the computing device(s) 634 via the network(s) 636. In some examples, the vehicle 602 may receive sensor data from the computing device(s) 634 via the network(s) 636. The sensor data may include raw sensor data and/or processed sensor data and/or representations of sensor data. In some examples, the sensor data (raw or processed) may be sent and/or received as one or more log files.

The computing device(s) 634 may include processor(s) 638 and a memory 632 storing an occupancy grid component 640, a mapping component 642, a transformation component 644, and/or an occupancy grid memory 646.

The occupancy grid component 640 may be configured to allocate a portion of memory to an occupancy grid. Additionally, or alternatively, the occupancy grid component 640 may be configured to determine a warped occupancy grid associated with an environment. In some examples, the occupancy grid component 640 may represent an occupancy grid as a two-dimensional occupancy grid having cells corresponding to a two-dimensional space (e.g., having two perpendicular coordinate axes, such as, for example an x-axis and a y-axis). Additionally, or alternatively, the occupancy grid component 640 may represent the occupancy grid as a three-dimensional occupancy grid having cells corresponding to a three-dimensional space (e.g., having three mutually perpendicular coordinate axes, such as, for example, an x-axis, a y-axis, and a z-axis). In some examples, the occupancy grid component 640 may be configure the occupancy grid to store sensor data and/or sensor data returns associated with a warped occupancy grid indicating an indication occupancy of a cell by an object in the environment. Additionally, or alternatively, the occupancy grid component 640 may utilize a perception component associated with a vehicle and/or a vehicle controller controlling the vehicle to determine the occupancy grid. In some examples, the occupancy grid component 640 may configure the warped occupancy grid such that it is associated with the environment and/or fit to a trajectory of an autonomous vehicle. In some examples, the warped occupancy grid may be comprised of portions, or chunks, of the occupancy grid associated with the environment. The occupancy grid component 640 may determine the portions based on a curvature, a distance, and/or a period of time associated with the trajectory of an autonomous vehicle and/or a throughway which the trajectory passed through. Additionally, or alternatively, the occupancy grid component 640 may determine the portions based on a density of received data points (e.g., received from the planning component) associated with the autonomous vehicle. In some examples, the occupancy grid component 640 may configure the warped occupancy grid as a two-dimensional warped occupancy grid and/or a three-dimensional warped occupancy grid.

The mapping component 642 may be configured to map a warped occupancy grid of an environment to a global coordinate frame associated with the environment. In some examples, the mapping component 642 may be configured to determine the global coordinate frame based on a trajectory of a vehicle traversing the environment. For example, the mapping component 642 may be configured to associate coordinates with sensor data returns to map the sensor data returns to a corresponding cell of a warped occupancy grid based on the global coordinate frame.

The transformation component 644 may be configured to determine a transformation associated with a warped occupancy grid (or a portion thereof) based on characteristics of a non-linear throughway. The transformation component 644 may be configured to determine the transformation by utilizing a conformal transformation algorithm, allowing for accurate translation of data points stored in a portion of memory allocated to an occupancy grid to a respective portion of a warped occupancy grid associated with an environment and/or from a portion of a warped occupancy grid associated with an environment to a respective portion of memory allocated to an occupancy grid.

The occupancy grid memory 646 may be configured as discrete memory. In some examples, a portion of the occupancy grid memory 646 may be allocated to an occupancy grid. In some examples, the occupancy grid memory 646 may be configured to filter sensor data prior to and/or simultaneously with the storing of the sensor data in the occupancy grid memory 646. For example, a portion of the occupancy grid memory 646 may be allocated to cells of a portion of an occupancy grid. Additionally, or alternatively, the cells of the portion of the occupancy grid may correspond to cells of a portion of a warped occupancy grid associated with an environment through which a vehicle is traversing according to a trajectory. That is, sensor data associated with the cells of the warped occupancy grid may be stored in a portion of the occupancy grid memory 646 that correspond to the occupancy grid, and since the warped occupancy grid may be fit to a trajectory of a vehicle, the sensor data may be filtered to determine the sensor data associated with portions of the occupancy grid that correspond to the warped occupancy grid. As such, the occupancy grid memory 646 may be configured to store sensor data in a more compact manner, resulting in less memory usage and reduced processing times, given that only sensor data returns that correspond to the trajectory of a vehicle may be stored, and sensor data returns that correspond to portions of an occupancy grid that do not map to the warped occupancy grid may be ignored.

In various examples, the computing device(s) 634 may include one or more input/output (I/O) devices, such as via one or more interfaces 650. The interface(s) 650 may include I/O interfaces and/or network interfaces. The I/O interface(s) may include speakers, a microphone, a camera, and various user controls (e.g., buttons, a joystick, a keyboard, a keypad, etc.), a haptic output device, and so forth. The network interface(s) may include one or more interfaces and hardware components for enabling communication with various other devices over the network or directly. For example, network interface(s) may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

In some examples, a user may view a user interface associated with the evaluation component 540, such as to input data and/or view results via one or more interface(s) 650. In such examples, the interface(s) 650 may include one or more displays. Depending on the type of computing device, such as a user computing device, server computing device, or the like, the display may employ any suitable display technology. For example, the display may be a liquid crystal display, a plasma display, a light emitting diode display, an OLED (organic light-emitting diode) display, an electronic paper display, or any other suitable type of display able to present digital content thereon. In some examples, the display may have a touch sensor associated with the display to provide a touchscreen display configured to receive touch inputs for enabling interaction with a graphical user interface presented on the display. Accordingly, examples herein are not limited to any particular display technology.

The processor(s) 616 of the vehicle 602 and the processor(s) 638 of the computing device(s) 634 may be any suitable processor capable of executing instructions to process data and perform operations as described herein. By way of example and not limitation, the processor(s) 616 and 638 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 618 and 632 are examples of non-transitory computer-readable media. The memory 618 and 632 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 618 and 632 can be implemented as a neural network.

As described herein, an exemplary neural network is an algorithm that passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning or machine-learned algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet52, ResNet101, VGG, DenseNet, PointNet, and the like.

EXAMPLE CLAUSES

A. A system comprising: one or more processors; and one or more non-transitory computer-readable media storing computer-executable instructions that, when executed, cause the system to perform operations comprising: receiving a trajectory associated with an autonomous vehicle traversing an environment; determining that at least a portion of the trajectory passed through a non-linear throughway; determining a characteristic of a shape of the non-linear throughway; determining, based at least in part on the characteristic, a transformation; fitting a warped occupancy grid to the non-linear throughway, wherein the warped occupancy grid is based at least in part on the transformation and the warped occupancy grid includes non-polygonal cells corresponding to the non-linear throughway; receiving lidar data from a sensor associated with the autonomous vehicle traversing the environment; associating the lidar data with the warped occupancy grid; storing, based on the transformation, the lidar data in the warped occupancy grid; and controlling the autonomous vehicle based at least in part on the lidar data.

B. The system of paragraph A, wherein the transformation is based at least in part on a conformal transform algorithm.

C. The system of paragraphs A or B, the operations further comprising: determining a width associated with the autonomous vehicle; determining a buffer associated with the autonomous vehicle based at least in part on the environment; and fitting the warped occupancy grid to the non-linear throughway based at least in part on the width and the buffer associated with the autonomous vehicle.

D. The system of any one of paragraphs A-C, the operations further comprising: determining an arc of the shape of the non-linear throughway; determining that a degree of the arc is greater than a threshold degree; and determining the transformation based at least in part on the degree of the arc of the shape of the non-linear throughway being greater than the threshold degree.

E. The system of any one of paragraphs A-D, the operations further comprising determining a size of the warped occupancy grid based at least in part on at least one of: a distance associated with at least the non-linear throughway; or a time period associated with the autonomous vehicle traversing at least the non-linear throughway.

F. A method comprising: determining an area associated with a vehicle traversing an environment; determining, based at least in part on a non-linear portion of the area to be traversed by the vehicle, a warped occupancy grid; receiving sensor data from a sensor associated with the vehicle; associating the sensor data with the warped occupancy grid; storing, based at least in part on a transformation associated with the warped occupancy grid, the sensor data in the warped occupancy grid; and controlling the vehicle based at least in part on the sensor data.

G. The method of paragraph F, further comprising: determining an arc of the non-linear portion of the area; determining a characteristic of the arc of the non-linear portion of the area, wherein the characteristic includes at least one of: a degree of the arc; or a length of the arc; determining, based at least in part on the arc and the characteristic, the transformation; determining the warped occupancy grid based at least in part on the transformation; and fitting the warped occupancy grid to the non-linear portion of the area, wherein the warped occupancy grid includes non-polygonal cells corresponding to the non-linear portion of the area.

H. The method of paragraphs F or G, further comprising: determining a detection based at least in part on the warped occupancy grid; and controlling the vehicle based at least in part on the detection.

I. The method of any one of paragraphs F-H, further comprising: determining a width associated with the vehicle; determining a buffer associated with the vehicle based at least in part on the environment; and fitting the warped occupancy grid to the non-linear portion of the area based at least in part on the width and the buffer associated with the vehicle.

J. The method of any one of paragraphs F-I, wherein the warped occupancy grid is one of a two-dimensional warped occupancy grid or a three-dimensional warped occupancy grid.

K. The method of any one of paragraphs F-J, further comprising determining a size of the warped occupancy grid based at least in part on at least one of: a curvature associated with at least the non-linear portion of the area; a distance associated with at least the non-linear portion of the area; or a time period associated with the vehicle traversing at least the non-linear portion of the area.

L. The method of any one of paragraphs F-K, wherein the non-linear portion of the area is a first non-linear portion of the area, the warped occupancy grid is a first warped occupancy grid associated with the first non-linear portion of the area, and the transformation is a first transformation, and the method further comprising: determining, based at least in part on a second non-linear portion of the area to be traversed by the vehicle, a second warped occupancy grid; aligning the second warped occupancy grid to an end of the first warped occupancy grid based at least in part on a deformation function; determining a second transformation associated with the second warped occupancy grid; associating the sensor data with the second warped occupancy grid; storing, based at least in part on the second transformation, the sensor data in the second warped occupancy grid; and controlling the vehicle based at least in part on the sensor data stored in the second warped occupancy grid.

M. The method of any one of paragraphs F-L, wherein the transformation is based at least in part on a conformal transform algorithm.

N. One or more non-transitory computer-readable media storing instructions executable by one or more processors, wherein the instructions, when executed, cause the one or more processors to perform operations comprising: determining an area associated with a vehicle traversing an environment; determining, based at least in part on a non-linear portion of the area to be traversed by the vehicle, a warped occupancy grid; receiving sensor data from a sensor associated with the vehicle; associating the sensor data with the warped occupancy grid; storing, based at least in part on a transformation associated with the warped occupancy grid, the sensor data in the warped occupancy grid; and controlling the vehicle based at least in part on the sensor data.

O. The one or more non-transitory computer-readable media of paragraph N, the operations further comprising: determining an arc of the non-linear portion of the area; determining a characteristic of the arc of the non-linear portion of the area, wherein the characteristic includes at least one of: a degree of the arc; or a length of the arc; determining, based at least in part on the arc and the characteristic, the transformation; determining the warped occupancy grid based at least in part on the transformation; and fitting the warped occupancy grid to the non-linear portion of the area, wherein the warped occupancy grid includes non-polygonal cells corresponding to the non-linear portion of the area.

P. The one or more non-transitory computer-readable media of paragraphs N or O, the operations further comprising: determining a detection based at least in part on the warped occupancy grid; and controlling the vehicle based at least in part on the detection.

Q. The one or more non-transitory computer-readable media of any one of paragraphs N-P, the operations further comprising: determining a width associated with the vehicle; determining a buffer associated with the vehicle based at least in part on the environment; and fitting the warped occupancy grid to the non-linear portion of the area based at least in part on the width and the buffer associated with the vehicle.

R. The one or more non-transitory computer-readable media of any one of paragraphs N-Q, wherein the warped occupancy grid is one of a two-dimensional warped occupancy grid or a three-dimensional warped occupancy grid.

S. The one or more non-transitory computer-readable media of any one of paragraphs N-R, the operations further comprising determining a size of the warped occupancy grid based at least in part on at least one of: a curvature associated with at least the non-linear portion of the area; a distance associated with at least the non-linear portion of the area; and a time period associated with the vehicle traversing at least the non-linear portion of the area.

T. The one or more non-transitory computer-readable media of any one of paragraphs N-S, wherein the non-linear portion of the area is a first non-linear portion of the area, the warped occupancy grid is a first warped occupancy grid associated with the non-linear portion of the area, and the transformation is a first transformation, and the operations further comprising: determining, based at least in part on the a second non-linear portion of the area to be traversed by the vehicle, a second warped occupancy grid; aligning the second warped occupancy grid to an end of the first warped occupancy grid based at least in part on a deformation function; determining a second transformation associated with the second warped occupancy grid; associating the sensor data with the second warped occupancy grid; storing, based at least in part on the second transformation, the sensor data in the second warped occupancy grid; and controlling the vehicle based at least in part on the sensor data stored in the second warped occupancy grid.

While the example clauses described above are described with respect to one particular implementation, it should be understood that, in the context of this document, the content of the example clauses can also be implemented via a method, device, system, computer-readable medium, and/or another implementation. Additionally, any of examples A-T can be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the system to perform operations comprising:
receiving a trajectory associated with an autonomous vehicle traversing an environment;
determining that at least a portion of the trajectory passed through a non-linear throughway;
determining an arc associated with a shape of the non-linear throughway;
determining that a degree of the arc satisfies a threshold degree;
determining, based at least in part on the degree of the arc satisfying the threshold degree, a transformation;
fitting a warped occupancy grid to the non-linear throughway, wherein the warped occupancy grid is based at least in part on the transformation and the warped occupancy grid includes non-polygonal cells corresponding to the non-linear throughway;
receiving lidar data from a sensor associated with the autonomous vehicle traversing the environment;
associating the lidar data with the warped occupancy grid;
storing, based on the transformation, the lidar data in the warped occupancy grid; and controlling the autonomous vehicle based at least in part on the lidar data.

2. The system of claim 1, wherein the transformation is based at least in part on a conformal transform algorithm.

3. The system of claim 1, the operations further comprising:
determining a width associated with the autonomous vehicle;
determining a buffer associated with the autonomous vehicle based at least in part on the environment; and
fitting the warped occupancy grid to the non-linear throughway based at least in part on the width and the buffer associated with the autonomous vehicle.

4. The system of claim 1, the operations further comprising determining a size of the warped occupancy grid based at least in part on at least one of:
a distance associated with at least the non-linear throughway; or
a time period associated with the autonomous vehicle traversing at least the non-linear throughway.

5. The system of claim 1, wherein the transformation is determined further based on an inverted transformation algorithm associated with a non-warped occupancy grid; and
wherein storing an individual lidar data point of the lidar data in the warped occupancy grid preserves a respective location in the non-warped occupancy grid of the individual lidar data point.

6. A method comprising:
determining an area associated with a vehicle traversing an environment;
determining, based at least in part on a degree of an arc associated with a shape of a non-linear portion of the area to be traversed by the vehicle satisfying a threshold degree, a warped occupancy grid;
receiving sensor data from a sensor associated with the vehicle;
associating the sensor data with the warped occupancy grid;
storing, based at least in part on a transformation associated with the warped occupancy grid, the sensor data in the warped occupancy grid; and
controlling the vehicle based at least in part on the sensor data.

7. The method of claim 6, further comprising:
determining, based on at least one of the degree of the arc and a length of the arc, the transformation;
determining the warped occupancy grid based at least in part on the transformation; and
fitting the warped occupancy grid to the non-linear portion of the area, wherein the warped occupancy grid includes non-polygonal cells corresponding to the non-linear portion of the area.

8. The method of claim 6, further comprising:
determining a detection based at least in part on the warped occupancy grid; and
controlling the vehicle based at least in part on the detection.

9. The method of claim 6, further comprising:
determining a width associated with the vehicle;
determining a buffer associated with the vehicle based at least in part on the environment; and
fitting the warped occupancy grid to the non-linear portion of the area based at least in part on the width and the buffer associated with the vehicle.

10. The method of claim 6, wherein the warped occupancy grid is one of a two-dimensional warped occupancy grid or a three-dimensional warped occupancy grid.

11. The method of claim 6, further comprising determining a size of the warped occupancy grid based at least in part on at least one of:
a curvature associated with at least the non-linear portion of the area;
a distance associated with at least the non-linear portion of the area; or
a time period associated with the vehicle traversing at least the non-linear portion of the area.

12. The method of claim 6, wherein the non-linear portion of the area is a first non-linear portion of the area, the warped occupancy grid is a first warped occupancy grid associated with the first non-linear portion of the area, and the transformation is a first transformation, and the method further comprising:
determining, based at least in part on a second non-linear portion of the area to be traversed by the vehicle, a second warped occupancy grid;
aligning the second warped occupancy grid to an end of the first warped occupancy grid based at least in part on a deformation function;
determining a second transformation associated with the second warped occupancy grid;
associating the sensor data with the second warped occupancy grid;
storing, based at least in part on the second transformation, the sensor data in the second warped occupancy grid; and
controlling the vehicle based at least in part on the sensor data stored in the second warped occupancy grid.

13. The method of claim 6, wherein the transformation is based at least in part on a conformal transform algorithm.

14. One or more non-transitory computer-readable media storing instructions executable by one or more processors, wherein the instructions, when executed, cause the one or more processors to perform operations comprising:
determining an area associated with a vehicle traversing an environment;
determining, based at least in part on a degree of an arc associated with a shape of a non-linear portion of the area to be traversed by the vehicle satisfying a threshold degree, a warped occupancy grid;
receiving sensor data from a sensor associated with the vehicle;
associating the sensor data with the warped occupancy grid;
storing, based at least in part on a transformation associated with the warped occupancy grid, the sensor data in the warped occupancy grid; and
controlling the vehicle based at least in part on the sensor data.

15. The one or more non-transitory computer-readable media of claim 14, the operations further comprising:
determining, based on at least one of the degree of the arc and a length of the arc, the transformation;
determining the warped occupancy grid based at least in part on the transformation; and
fitting the warped occupancy grid to the non-linear portion of the area, wherein the warped occupancy grid includes non-polygonal cells corresponding to the non-linear portion of the area.

16. The one or more non-transitory computer-readable media of claim 14, the operations further comprising:
determining a detection based at least in part on the warped occupancy grid; and
controlling the vehicle based at least in part on the detection.

17. The one or more non-transitory computer-readable media of claim 14, the operations further comprising:
- determining a width associated with the vehicle;
- determining a buffer associated with the vehicle based at least in part on the environment; and
- fitting the warped occupancy grid to the non-linear portion of the area based at least in part on the width and the buffer associated with the vehicle.

18. The one or more non-transitory computer-readable media of claim 14, wherein the warped occupancy grid is one of a two-dimensional warped occupancy grid or a three-dimensional warped occupancy grid.

19. The one or more non-transitory computer-readable media of claim 14, the operations further comprising determining a size of the warped occupancy grid based at least in part on at least one of:
- a curvature associated with at least the non-linear portion of the area;
- a distance associated with at least the non-linear portion of the area; and
- a time period associated with the vehicle traversing at least the non-linear portion of the area.

20. The one or more non-transitory computer-readable media of claim 14, wherein the non-linear portion of the area is a first non-linear portion of the area, the warped occupancy grid is a first warped occupancy grid associated with the non-linear portion of the area, and the transformation is a first transformation, and the operations further comprising:
- determining, based at least in part on the a second non-linear portion of the area to be traversed by the vehicle, a second warped occupancy grid;
- aligning the second warped occupancy grid to an end of the first warped occupancy grid based at least in part on a deformation function;
- determining a second transformation associated with the second warped occupancy grid;
- associating the sensor data with the second warped occupancy grid;
- storing, based at least in part on the second transformation, the sensor data in the second warped occupancy grid; and
- controlling the vehicle based at least in part on the sensor data stored in the second warped occupancy grid.

* * * * *